Patented Sept. 16, 1941

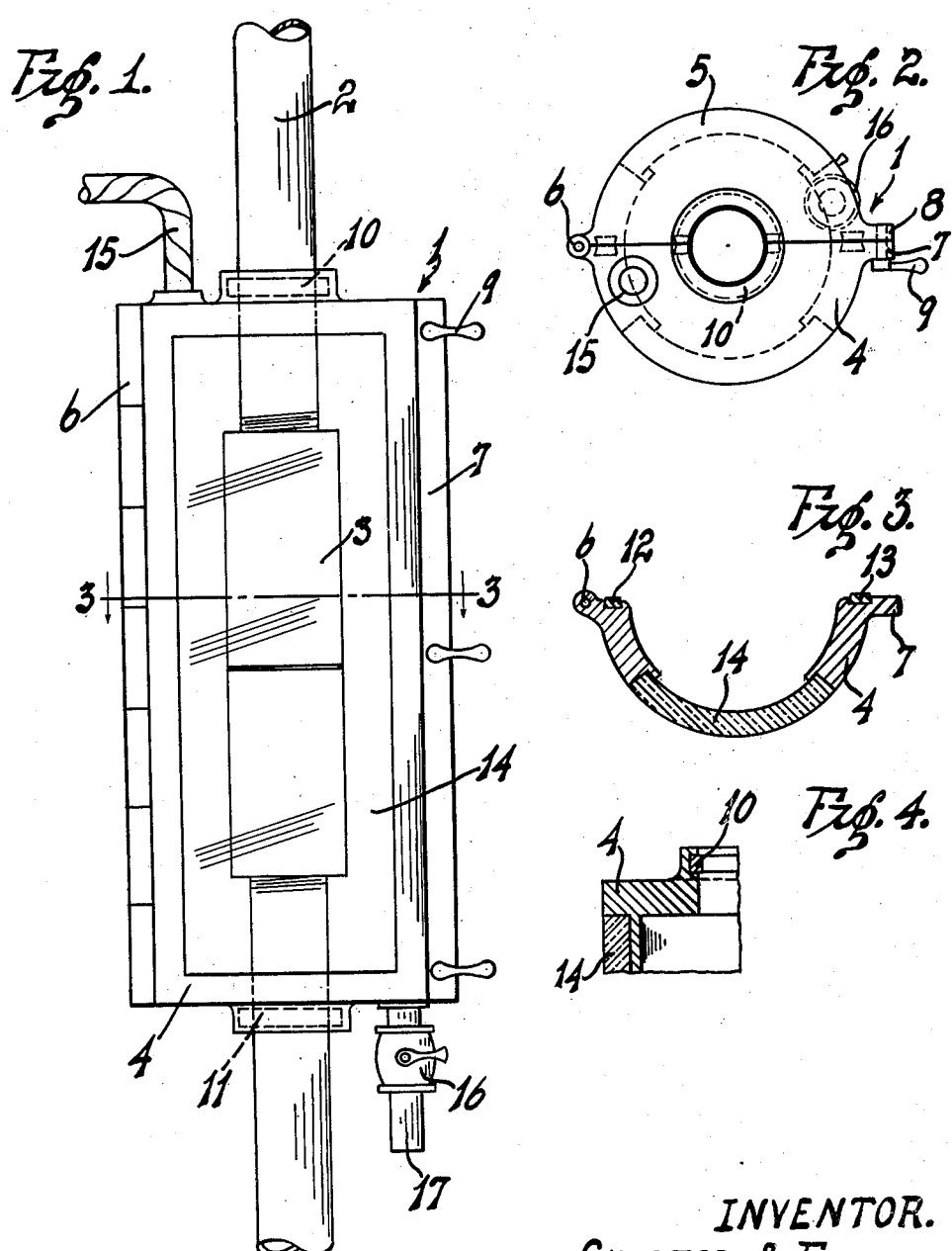

2,255,921

UNITED STATES PATENT OFFICE 2,255,921

PIPE JOINT TESTER

Chester A. Fear, Long Beach, Calif.

Application March 17, 1939, Serial No. 262,436

2 Claims. (Cl. 73—51)

This invention relates to a pipe joint tester for the purpose of testing the joints of pipe for leaks.

An object of my invention is to provide a novel pipe joint tester, which can be quickly and easily placed on the pipe around the joint and sealed when in closed position, so that vacuum or pressure can be applied to the inside of the tester, thereby determining presence of any leaks in the joint.

Another object of my invention is to provide a novel pipe joint tester, comprising a pair of hinged sections, which encircle the pipe, the sections being clamped together providing a tight chamber around the joint of the pipe for the purpose of testing the same.

Another object of my invention is to provide a novel pipe joint tester of the character stated, provided with transparent windows so that the operator may observe the pipe joint positioned within the tester.

Other objects, advantages and features of invention may appear from the accompanying drawing, the subjoined detailed description, and the appended claims.

In the drawing:

Figure 1 is a side elevation of my pipe joint tester assembled on a pipe.

Figure 2 is a top plan view of the tester.

Figure 3 is a transverse, sectional view of one of the tester sections taken on line 3—3 of Figure 1.

Figure 4 is a fragmentary, vertical sectional view of the upper part of one of the tester sections.

Referring more particularly to the drawing, the numeral 1 indicates a pipe joint tester, which is adapted to be assembled around a pipe 2 and enclosing the joint 3 of the pipe. The coupling or joint 3 usually consists of threaded collars, into which the pipe sections are threaded. The threaded connections are frequency faulty or loose, and it is at this point that leaks might occur. The tester 1 includes a pair of similar sections 4, 5, which are hingedly attached together along one edge, as shown at 6. The outer or swinging ends of the sections 4, 5 are each flanged, as shown at 7 and 8. A plurality of latches 9 extend through the flanges for the purpose of securing the tester around the pipe. The latches 9 are preferably of a quick acting type, either screw, cam or the like. The sections 4 and 5 are closed at the top and the bottom, and suitable annular packing 10 and 11 is provided in the sections and encircles the pipe 2, as shown in Figure 1. Strip packing 12 and 13 is provided at the hinge and swinging ends of the sections 4 and 5 for the purpose of sealing both edges of the sections, and thus effectively preventing leaks.

A transparent pane 14 is mounted in each of the sections 4 and 5 so that the operator can observe the joint 3. A hose or pipe 15 extends into one of the sections and communicates with the space within the tester. This hose or pipe extends to a suitable pressure or vacuum pump, so that either pressure or vacuum may be exerted within the tester when assembled around a pipe.

A relief valve 16 controls the outlet pipe 17 in the bottom of the tester. I prefer to operate my tester with vacuum and in operation the threaded joints of the pipe are first soaked. Thereafter, the tester 1 is assembled around the pipe, as shown in Figure 1. A vacuum pump, to which the pipe 15 extends, operates continuously, and as soon as the tester is closed around the pipe, the space within the tester will be evacuated and soap bubbles on the joint of the pipe will indicate a leak.

To remove the tester from around the pipe, the valve 16 is opened, thus relieving the vacuum within the tester. The latches 9 are now released and the two sections can be swung apart on the hinge 6 and readily removed from about the pipe.

Having described my invention, I claim:

1. A pipe joint tester comprising a pair of sections, means hingedly mounting the sections along one vertical edge thereof, latch means on the swinging edges of the sections, a transparent pane in the side of each of the sections, an intake pipe extending into one of the sections, an outlet pipe extending from one of the sections, a valve in the outlet pipe, the packing means in the tester at the top and bottom thereof, said packing means surrounding the pipe, and packing means on the hinge and swinging edges of the sections.

2. A pipe joint tester comprising a pair of complementary semi-cylindrical sections, a vertical hinge extending along one of the edges of the sections, releasable latch means connecting the swinging edges of the sections, a glass pane in the side of each of the sections, an intake pipe extending into one of the sections and an outlet pipe extending from the lower end of one of the sections, a valve in the outlet pipe, packing means in each of the sections at the top and bottom thereof, said packing means surrounding the pipe and packing means on the hinge and swinging edges of the sections.

CHESTER A. FEAR.